United States Patent
Anderson

(12) 
(10) Patent No.: US 6,199,032 B1
(45) Date of Patent: Mar. 6, 2001

(54) PRESENTING AN OUTPUT SIGNAL GENERATED BY A RECEIVING DEVICE IN A SIMULATED COMMUNICATION SYSTEM

(75) Inventor: Harry R. Anderson, Eugene, OR (US)

(73) Assignee: EDX Engineering, Inc., Eugene, OR (US)

( * ) Notice: Subject to any disclaimer, the term of this patent is extended or adjusted under 35 U.S.C. 154(b) by 0 days.

(21) Appl. No.: 09/120,826

(22) Filed: Jul. 22, 1998

Related U.S. Application Data

(60) Provisional application No. 60/053,483, filed on Jul. 23, 1997, and provisional application No. 60/065,615, filed on Nov. 18, 1997.

(51) Int. Cl.[7] .............................. G06F 9/44; G06F 13/10; G06F 13/12

(52) U.S. Cl. .................................. 703/21; 703/4; 703/5; 703/22; 342/359; 455/446

(58) Field of Search .................................. 703/13, 18, 20, 703/21, 22, 2, 4, 5; 455/449; 375/219; 342/359; 707/103

(56) References Cited

U.S. PATENT DOCUMENTS

| | | | |
|---|---|---|---|
| 5,543,857 | 8/1996 | Wehmeyer et al. | 348/589 |
| 5,574,466 * | 11/1996 | Reed et al. | 342/359 |
| 5,793,801 * | 8/1998 | Fertner | 375/219 |
| 5,806,068 * | 9/1998 | Shaw et al. | 707/103 |
| 5,953,669 | 9/1999 | Stratis et al. | 455/449 |
| 5,987,328 * | 11/1999 | Ephremides et al. | 455/449 |

OTHER PUBLICATIONS

Young, "Calibrating Your TV Can Be Complicated, But With A Few Special Tools, You'll Be On Your Way," *Home Theatre Magazine*, Sep. 1997.

Kumin, "Disc–o–Tech," *Video Magazine*, p. 19, Dec. 1997.

Kumin, "Give it a Hand: Ovation Software Avia CD–ROM," *Video Magazine*, p. 61, Jan. 1998.

Software product CelPlan as depicted in "CelPlan Wireless Software" brochure, 8 pages, in public use at least as early as Jun., 1997.

Software product CellCAD™ II, as depicted in CellCAD™ II brochure, 4 pages, in public use at least as early as Jun., 1997.

Software product PLANET™, as depicted in PLANET™ Mobile Systems International brochure, 8 pages, in public use at least as early as Jun., 1997.

Software product ODYSSEY, as depicted in Computer Aided Radio Engineering, AETHOS ODYSSEY brochure, 4 pages, in public use at least as early as Jun., 1997.

Software product Granet®, as depicted in Granet® graphical radio network engineering tool brochure, 6 pages, in public use at least as early as Jun., 1997.

* cited by examiner

*Primary Examiner*—Kevin J. Teska
*Assistant Examiner*—Samuel Broda
(74) *Attorney, Agent, or Firm*—Klarquist Sparkman Campbell Leigh & Whinston, LLP

(57) ABSTRACT

A computer software program simulates a communication network using network characteristic information provided by communication network designers. When a network designer selects a particular location within the network, the software consults the network characteristic information to predict a signal attribute of a simulated signal received at the selected location. The predicted attribute is used to modify a template signal to produce a simulated output signal, and the simulated output signal is presented for consideration by the network designers.

20 Claims, 10 Drawing Sheets

PRESENTING AN OUTPUT SIGNAL GENERATED BY A RECEIVING DEVICE IN A SIMULATED COMMUNICATION SYSTEM

RELATED APPLICATION DATA

This application is based on U.S. Provisional Patent Application Ser. No. 60/053,483, filed on Jul. 23, 1997, and U.S. Provisional Patent Application Ser. No. 60/065,615, filed on Nov. 18, 1997.

FIELD OF THE INVENTION

This invention relates to designing and predicting the performance of communication systems. More particularly, the invention relates to presenting a simulated output signal to indicate predicted communication system performance.

BACKGROUND AND SUMMARY OF THE INVENTION

Both wired and wireless communication systems electronic communication systems have come into widespread use, and some systems use a combination of both wired and wireless elements. For example, a communication system may be composed of many mobile wireless transceivers and a set of stationary transceivers which serve to link a wireless transceiver with other wireless transceivers, telephone lines, or some other communication system. An input signal (e.g., a human voice) is received by a mobile transceiver and results in a transmitted signal (e.g., a digital or FM radio signal). The transmitted signal is then received by the stationary transceiver which relays the signal to a receiving mobile transceiver. The mobile transceiver receives the signal (e.g., a digital or FM radio signal) and produces an output signal (e.g., the human voice as presented by a cellular phone speaker).

When a communication system such as the above example is designed, the designer must make decisions regarding where to place the stationary transceivers. Each stationary transceiver typically provides acceptable service over only a limited geographical area due to many variables such as distance, terrain, climate, and interference. When designing other communication systems, other parameters may be involved. Due to the mathematical complexity in determining how these variables affect system performance, communication system developers typically use a computer system running communication system design software to design the communication system.

A useful feature of communication system design software is the ability to predict the performance of the system at a given location. For example, a software tool may be used to design a cellular phone network composed of several transceiver towers. Given a physical location, the software can predict the field strength or power level of a signal from a transceiver tower or choose the strongest signal available from several transceiver towers. In this way, the software provides an indication of the performance of the system as perceived by a communication system user at a particular geographical location. The designer can then use the software to reposition the towers during the design phase in an attempt to find an optimal tower arrangement. As a result, the system designer can design a system providing a desired level of system performance over a greater geographical area while using fewer towers. In addition, the designer avoids the cost of having to actually construct the communication system in order to predict its performance. In wired systems, a location may not be a geographical location, but rather a logical location within elements of the communication system, such as at a particular amplifier or module.

Given a location, the design software may present the predicted attribute of a signal as a numerical value, (e.g., 7.453 dBuV/m). A numerical value, however, is of limited usefulness because prior knowledge and experience are required to determine if the numerical value is within an acceptable range. Further, the numerical value does not provide a readily understandable indication of how the system performance will be perceived by the communication system user.

Some communication system design software addresses these problems by drawing a system map of the communication system. On the map, various colors are used to denote the values of a particular signal attribute at locations on the map. For example, if the attribute at a particular location has a value between 50.0 and 60.0, the software might use the color green when drawing the location on the map. Values between 40.0 and 50.0 might be drawn with blue. In this way, the designer can determine at a glance the approximate values of the signal attribute at a particular location on the map. However, the use of colors still requires prior knowledge and experience to determine if the color is within an acceptable range. Further, the color still does not provide a readily understandable indication of how the system performance will be perceived by the communication system user.

Each of these problems with communication system design software are compounded by the variety of signal types that may be transmitted over a communication system. For instance, voice, data, image, and video may each require a different level of performance. Thus, the numerical value or color generated by the design software may be acceptable for one signal type but not for another.

The invention avoids these problems by providing a simulated output signal. In one embodiment, an attribute of a signal at a particular location is calculated. A model signal is modified according to the calculated attribute to produce a simulated received signal. Interference is calculated and added to the simulated received signal, and modifications are made based on receiver characteristics to produce a simulated output signal. The simulated output signal can then be presented to the designer for evaluation.

In this way, the designer need not know the meaning of particular numerical values but can instead listen to and/or watch an output signal that serves as a simulation of what a communication system user would actually hear or see. For design systems that use color maps, the invention provides an additional way in which to judge system performance and a way to associate the colors with a simulated signal. Since the predicted attribute is presented in the way it would actually be perceived, it is more easily evaluated and understood without prior experience or training.

Additional features and advantages of the invention will be made apparent from the following detailed description of illustrated embodiments which proceeds with reference to the accompanying drawings.

DETAILED DESCRIPTION OF THE ILLUSTRATED EMBODIMENTS

Exemplary Operating Environment

Figure 1:
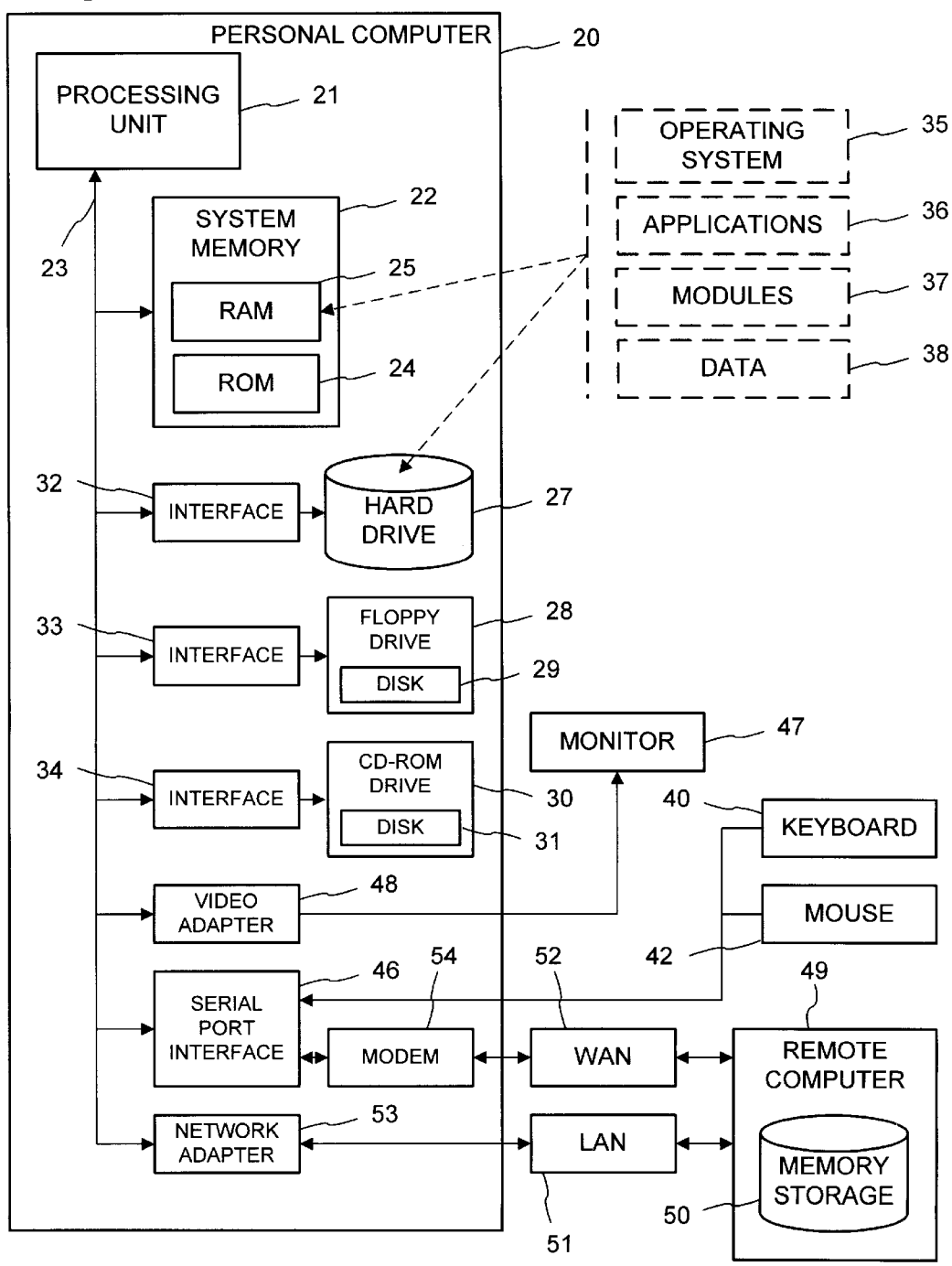
FIG. 1 is a block diagram of a computer system that may be used to implement a method and apparatus for embodying the invention.

FIG. 1 shows a suitable computing environment in which the invention may be implemented. While the invention will be described in the general context of computer-executable instructions of a computer program that runs on a personal computer, those skilled in the art will recognize that the invention also may be implemented in combination with other program modules and in machines other than personal computers. Generally, program modules include routines, programs, components, data structures, or the like, that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, video camera, or the like. These and other input devices are often connected to the processing unit 21 through a serial port interface 46 that is coupled to the system bus, but may be connected by other interfaces, such as a parallel port, video capture card, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Communication System Overview

Figure 2:
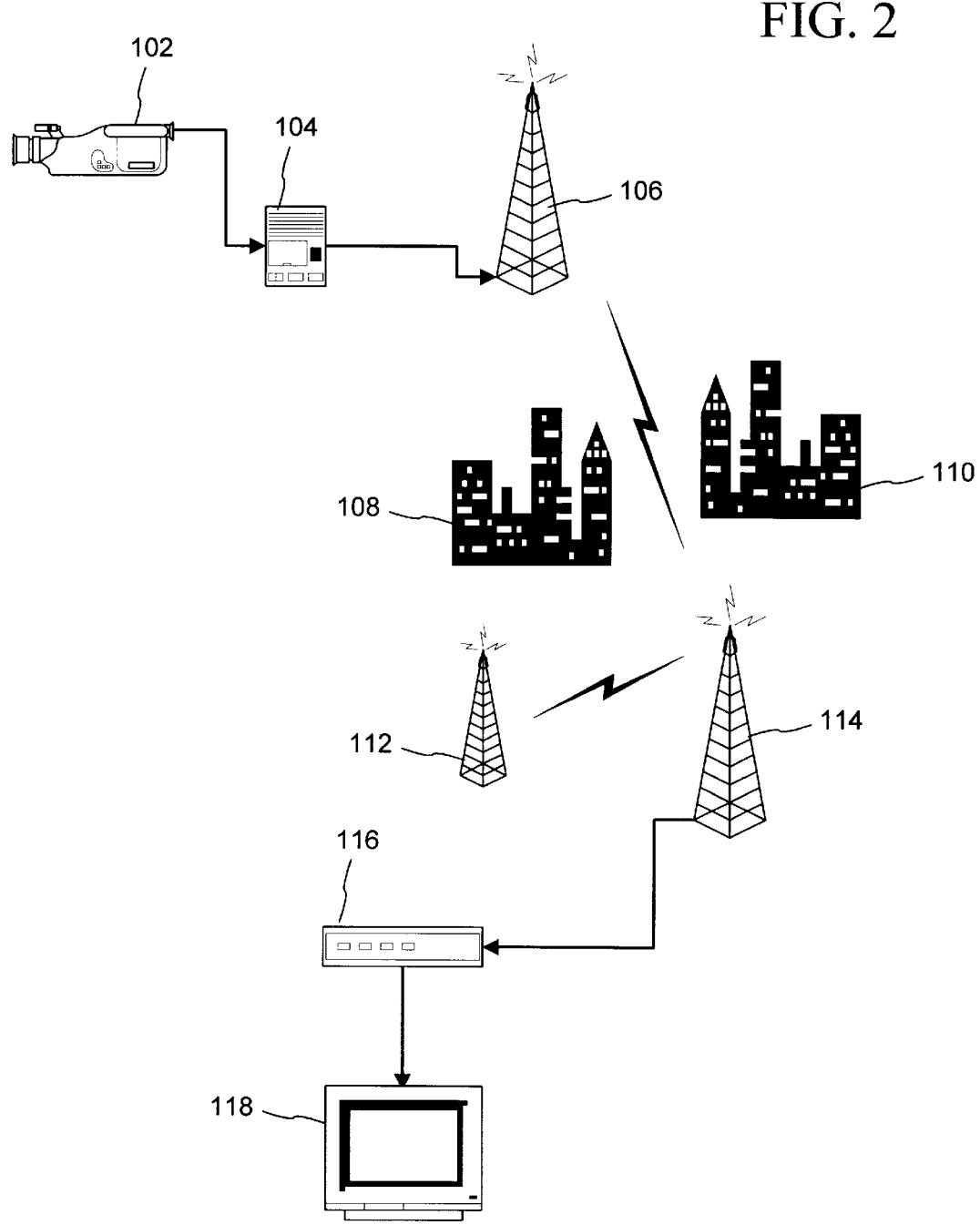
FIG. 2 is a block diagram of exemplary communication system elements.

FIG. 2 shows exemplary communication system elements that can be used when designing a communication system. While certain communication system elements are pictured, those skilled in the art will recognize that other elements and combinations of elements may be used. A signal source, such as a video camera 102 generates a communication signal, which is transmitted by a transmitter 104 through an antenna 106. The signal source may be any number of elements, such as a microphone, a playback mechanism, or some digital signal generator. On its way to a receiving antenna 114, the signal may encounter physical obstacles such as terrain or buildings 108 and 110. Also, interference from various sources such as another antenna 112 might interfere with the signal. Interference can be both natural and manmade and varies in intensity. The signal may take more than one path to the antenna 114. The attributes of the signal at antenna 114 may be affected by numerous factors such as distance, elevation, ground clutter, type of land use, atmospheric conditions, and ionospheric conditions.

Once the signal is received by the antenna 114, it is transmitted to a receiver 116 that presents it in the form of an output signal (e.g., sound, video, or the like) to the receiving user through an output device such as a video screen 118. The output device may take many forms, such as a speaker, a pager, or a personal communication system. Limitations in the receiver 116 or the video screen 118 may further affect the performance of the system as perceived by the system user.

Typical communication systems are considerably more complex than the one illustrated at FIG. 2. Numerous transmitters, receivers, and transceivers, both fixed and mobile may be used and may take many forms such as cellular phones, pagers, personal communication systems, and televisions. Additionally, some communication systems employ connections by use of media such as wires, coaxial cable, or fiber optic cable. In wireless systems, the frequencies used to transmit signals may vary considerably, and include VHF, UHF, and microwave wavelengths. Some systems amplify or redirect the signal using repeaters or satellite systems. It will be appreciated that the elements pictured are exemplary only, and many other elements and combinations may be used to form a communication system.

Signal Attribute Overview

A signal has many attributes. For example, a signal has a certain strength, distortion, amount of interference, or phase shift. Various means of predicting these attributes are available, many of which use software to calculate the predicted attribute. Since the attribute may vary based on a physical (i.e., geographical) or logical location, part of the calculation process is typically performed with reference to a particular location. In addition, various characteristics of the communication network may affect the attribute, so these are also included in the calculations related to determining the attribute. Different mathematical models exist for calculating the attribute of a signal, some of which are favored for particular purposes, such as complying with government regulations.

Description of the Design Program

Figure 3:
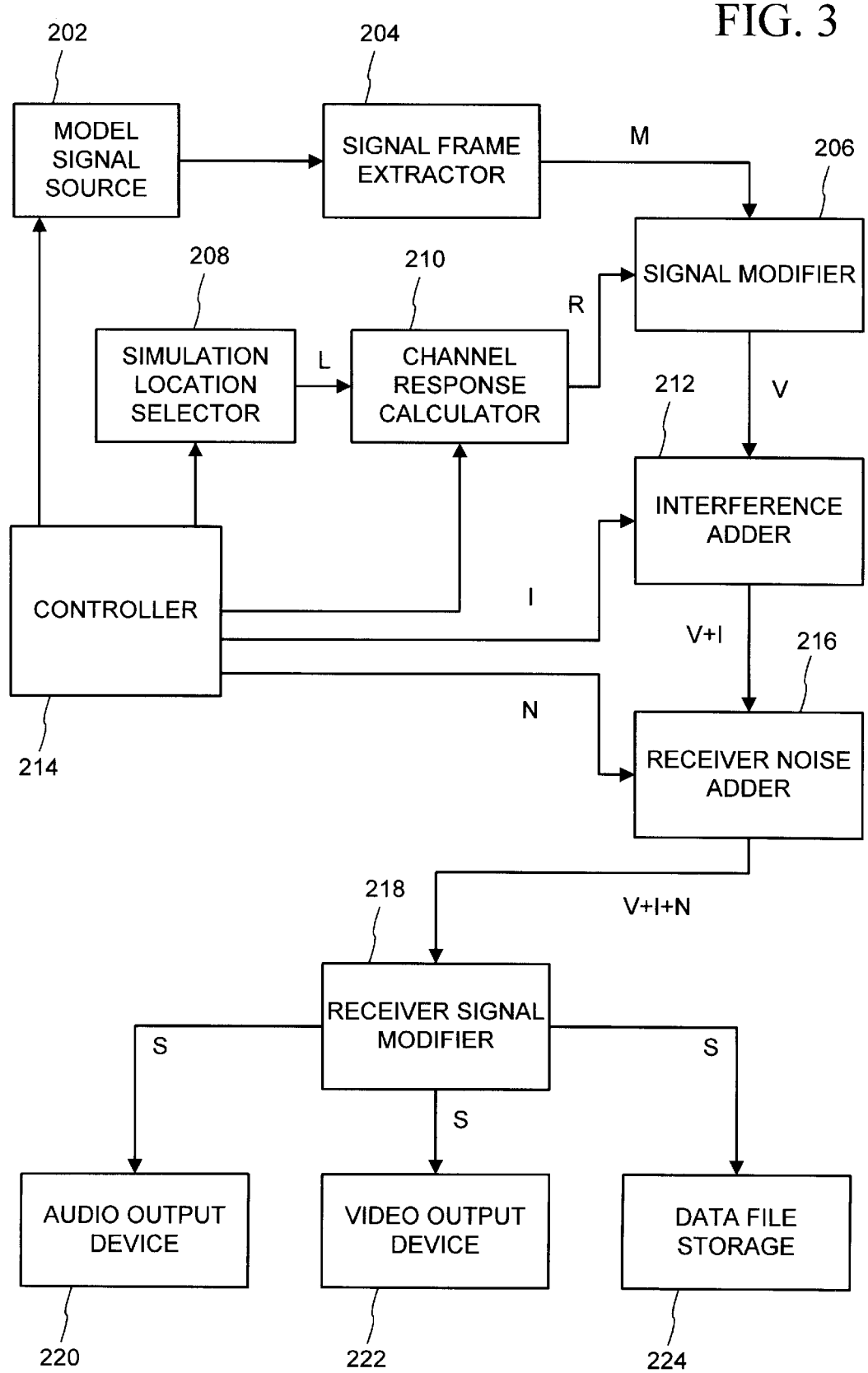
FIG. 3 is a block diagram showing data flow of a program which executes on a computer system such as shown in FIG. 1.

A block diagram of the architecture of a computer program that executes on computer 20 in accordance with the invention is shown at FIG. 3. A controller block 214 controls the program's overall operation. A signal frame extractor 204 uses a model signal source 202 to produce a model frame, M.

A simulation location selector 208 facilitates selction of a location L (e.g., by accepting input from a mouse or other pointing device), and a channel response calculator 210 calculates a channel response R at the location L. A signal modifier 206 uses the model frame M and the channel response R to generate the desired received signal V. An interference adder 212 adds interference I to the received signal V to produce simulated signal composite V+I. A receiver noise adder 216 adds noise signal N to produce simulated noise-signal composite V+I+N. A receiver signal modifier 218 accepts composite signal V+I+N and produces simulated received signal S, which is available to audio output device 220, video output device 222, or data file storage 224.

The audio output device may be, for example, an audio signal frame loader, an audio signal amplifier, and a speaker or headphones or some other arrangement. The video output device may be, for example, a video signal frame loader for loading frames of video into a display window on a video monitor, or some other arrangement. The data file storage may be any number of storage means, such as secondary storage or memory.

Initializing the Simulation

Figure 4:
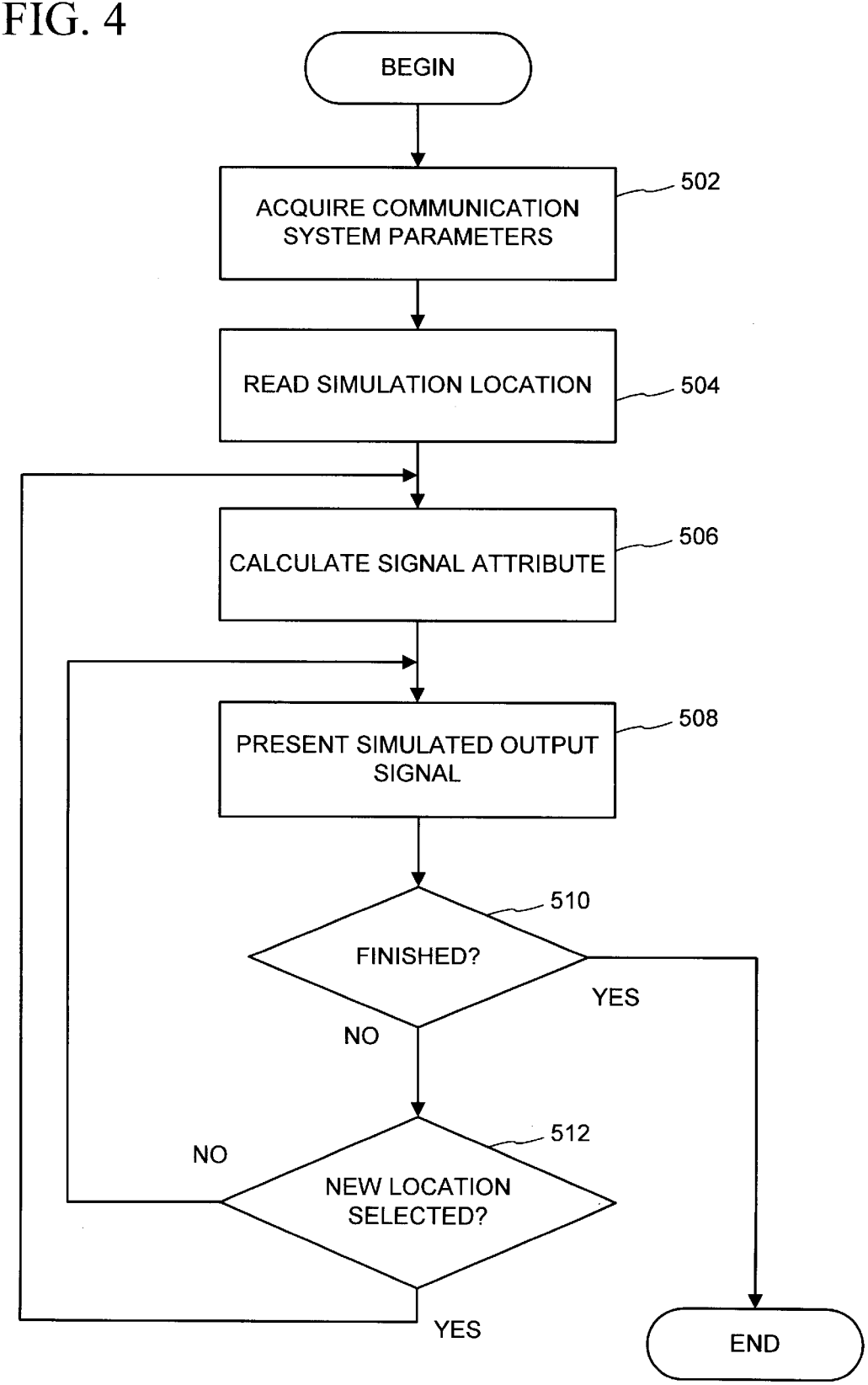
FIG. 4 is a flowchart of a method according to the invention for presenting a system map and simulated output signal.

A flowchart of a method according to the invention for generating a simulated output signal is shown at FIG. 4. When the program starts at step 502, certain parameters relating to the characteristics of the communication system are acquired so the program can predict the attribute of a signal at a particular location. For wireless systems, transmit station characteristics such as location (i.e., latitude, longitude, and elevation), power level, antenna type and pointing angles, and modulation type are specified. The characteristics for multiple transmitters may be specified. Also included are receive station characteristics such as sensitivity, noise figure, bandwidth, the type and use of equalizers, diversity techniques, error detection and correction mechanisms or the like. For wired systems, characteristics include the signal source characteristics, wired system layout, types of cable or optical fiber, location and type of amplifiers, and so forth. Also included for wired systems are the receive station characteristics as detailed above. The communication systems parameters are entered into the program via data files or via interactive data entry though dialog boxes or other data entry and selection methods. The parameters are stored in the program in data arrays, structures, or variables as may be appropriate for the particular type of data. In addition to specifying the characteristics of the communication systems, certain databases are selected. The databases are used to predict how the signal is affected as it transits from the transmitter to the receiver. For wireless systems, such databases can include terrain elevation values, ground clutter or land use types, the location and heights of buildings, atmospheric conditions (e.g., refractivity, rain intensity, and water vapor density), natural and manmade noise source location and intensity, and ionospheric conditions. The type of propagation model which is used in steps 506 and 608, below, is also selected. Additionally, the source of the model signal which will be used for the simulation is specified. This source can a stored source such as a sound, image, or video file such with a .WAV, .GIF, or .AVI file format or some other digital format. The source may also be a real time (i.e., "live") source such as a microphone or video camera. The video camera may or may not have audio capability.

Reading the Location

Figure 5:
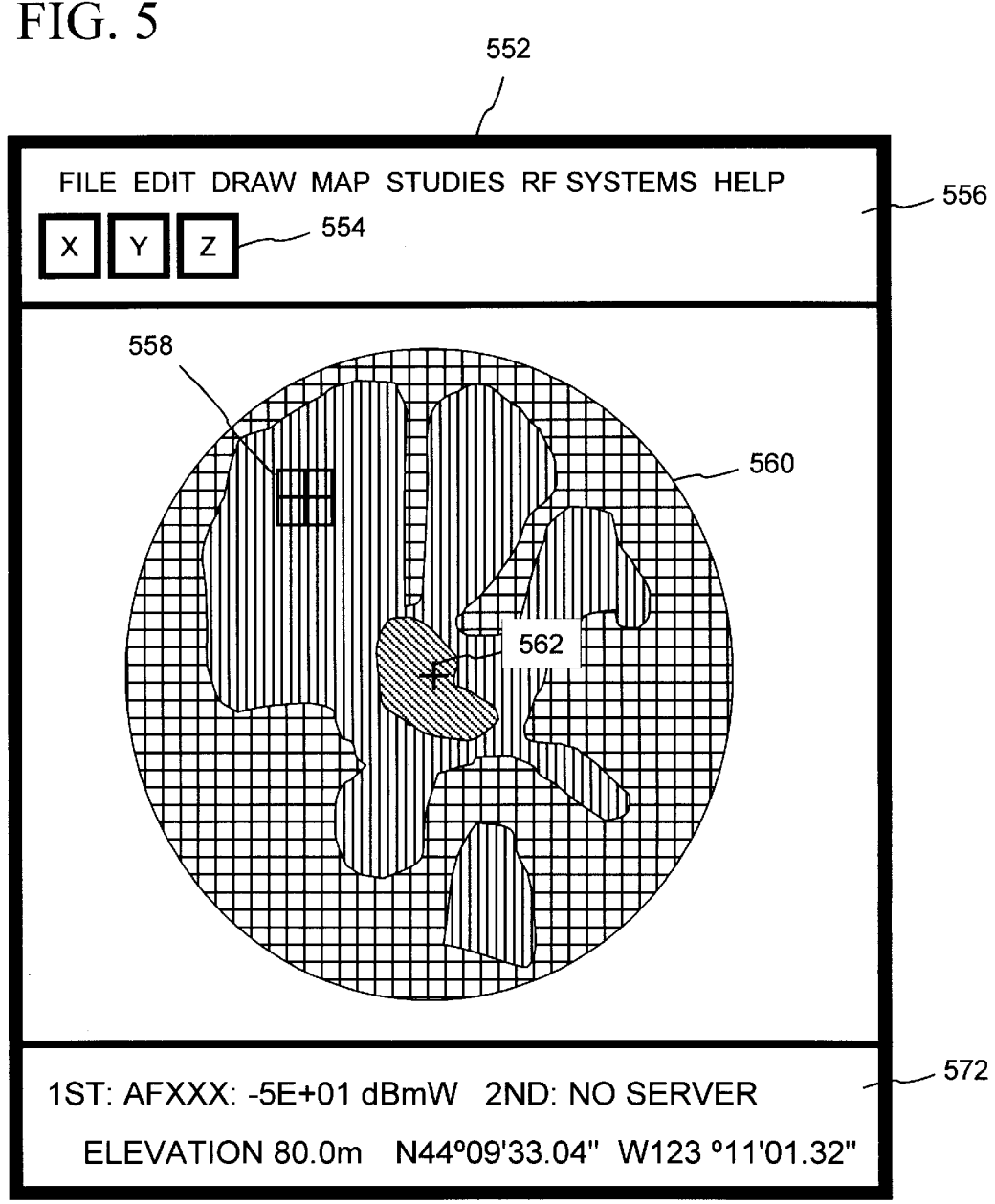
FIG. 5 is a view of a window presented by the program of FIG. 3.

FIG. 5 shows an exemplary system map displayed by the program of FIG. 3. The system map 560 appears in a graphical display window 552 and shows the geographical relationship of elements of the communication system. The window 552 also includes a command area 556 with icon buttons 554 for carrying out various functions (e.g., zooming or repositioning). The map 560 is generated by translating geographical locations for communication system elements as specified in step 502, above, into screen locations in pixels in the graphical display window 552 using appropriate graphical function calls, scaling factors, and map projection conversions. Various portions of the map 560 may be highlighted with color or other indicia indicating the attribute of a signal (e.g., field strength) at a particular location. The map 560 may also include a street map overlay for geographical reference and further indicate the position of transmit stations within the map (e.g., in the center of the example shown in FIG. 5 there is a transceiver tower denoted by a plus sign 562). For more detail concerning map projection conversions, see J. P. Synder, *Map Projections—A Working Manual.* U.S. Geological Survey Professional Paper 1395, United States Government Printing Office, Washington, D.C. 1987, which is hereby incorporated by reference. Instead of a geographical map, system map 560 may be a drawing. A drawing shows the relationship of elements of the communication system, which is not representative of the relative physical positions of those elements. Preferably, a pointing device such as a mouse or other input device is used to select a location on the system map and the coordinate values for that location are stored. A cursor 558 indicates the coordinates of the currently-selected location. These coordinates define signal simulation location L. Status pane 572 indicates various other information relating to signal characteristics and the selected signal simulation location. In the example shown in FIG. 5, a power level (in milliwatts) from a first and second transmit station is displayed, along with the elevation, latitude, and longitude of the simulation location.

Alternatively, plural simulation locations can be stored in a file to define a simulation route. In this way, the simulation output can represent a time sequence of simulations representing the signal at a mobile transceiver. For example, a file could store locations simulating an automobile travelling a route spanning a series of streets.

Presenting the Output Signal

After reading the simulation location L (step 504), a signal attribute is calculated at step 506, and the simulated output signal is presented in step 508. Details concerning steps 506 and 508 are provided below. At step 510, it is determined if a request to end the simulation has been issued. Typically, such a request is issued by a user though a keyboard, mouse, or some other input device. If a request to end the simulation has been issued, the program may end or automatically restart at step 502.

Otherwise, at step 512, it is determined if a new location has been selected. Typically, this is accomplished by reading a current location and comparing the current location with the previous location. If a new location has been selected, step 506 is performed to calculate the signal attribute at the new location. Otherwise, step 508 is again executed to present the simulated output signal for the same location.

Calculating the Attribute of the Signal at a Location

At step 506, a predicted attribute of the signal at the location L is calculated. An attribute is predicted by performing certain calculations on communication system parameters with respect to the location L. Other attributes may be predicted as part of steps 506 or 508 and may be calculated without regard to the location L. In the illustrated embodiment, the channel response R attribute of a communication channel at the location L is calculated. At the selected geographical location L for a wireless system, or at a logical location L within a wired system, a channel response R is calculated. The channel response is in the form of the impulse response of the channel and is calculated according to the following equation:

$$R = \sum_{n=1}^{N(p_1,p_2)} A_n(p_1, p_2)\delta(t - \tau_n(p_1, p_2))\exp(-j\theta_n(p_1, p_2) + \Delta\theta_n(p_1, p_2))) \quad (1)$$

where:
R=the propagation channel response for a signal transmitted from point p1 to point p2.
Point p1 is the transmit station location as specified in step 502 and point p2 is the receive station location L.
N=the number of signal paths from the p1 to p2. For most propagation models, N=1.
$A_n$=the amplitude of the transmitted signal at point p2 for the $n^{th}$ signal path.
t=time
$\tau_n$=the time delay for the arrival at p2 for the signal traveling along the $n^{th}$ signal path.
$\delta()$=the Dirac delta function.
$\theta_n$=the relative phase angle of the signal arriving at p2 for the signal traveling along the $n^{th}$ signal path.
$\Delta\theta_n$=the phase displacement due to the motion of the transmitter, the receiver, or any other element of the propagation environment. For wired systems, or for systems where the transmitter, receiver and propagation environment are immobile, this term is zero.

The parameters and variables identified in the equation can be found using various types of signal propagation modeling techniques. In particular, a technique known as ray-tracing can be used to find these parameters for wireless systems. For more detail concerning ray-tracing, see H. R. Anderson, "A Ray-Tracing Propagation Model For Digital Broadcast Systems In Urban Areas," *IEEE Trans. on Broadcasting,* vol. 39, no. 3, pp. 309–317, Sep. 1993 and H. R. Anderson, "Development and Applications of Site-Specific Microcell Communications Channel Modelling Using Ray-Tracing", Ph.D. Thesis, University of Bristol, United Kingdom, 1994, both of which are incorporated herein by reference.

Other propagation modeling techniques can be used. For more detail, see J. D. Parsons, *The Mobile Radio Propagation Channel,* Pentech Press, London, United Kingdom 1992. For detail concerning computer code for one type of propagation model, see A. G. Longley and P. L. Rice, "Prediction Of Tropospheric Radio Transmission Over Irregular Terrain—A Computer Method," ESSA Tech. Rep. ERL79-ITS67, 1968. Both of these documents are hereby incorporated by reference.

The channel response includes several characteristics of the channel that have a significant effect on the received signal. The most obvious of these characteristics is the channel attenuation that weakens the signal as it travels from the transmitter to the receiver. Channel attenuation is represented by $A_n$ in equation (1). The greater the channel attenuation, the lower the signal strength at the receiver. The strength of the signal at the receiver can have a direct effect on the quality of the communication the system user experiences. Channel response also includes multipath signals; i.e., several replicas of the signal that can arrive at the receiver via multiple physical routes. Multipath signals can cause fading and other effects on the signal at the receiver. The channel response as described by equation (1) takes into account channel attenuation, multipath and other such channel characteristics.

The channel response information is stored in memory. Depending on the type of propagation model selected in step 502, some variables in the equation may be irrelevant or unavailable, and may therefore be set to zero.

Details Concerning Presentation of a Simulated Output Signal

Figure 6:
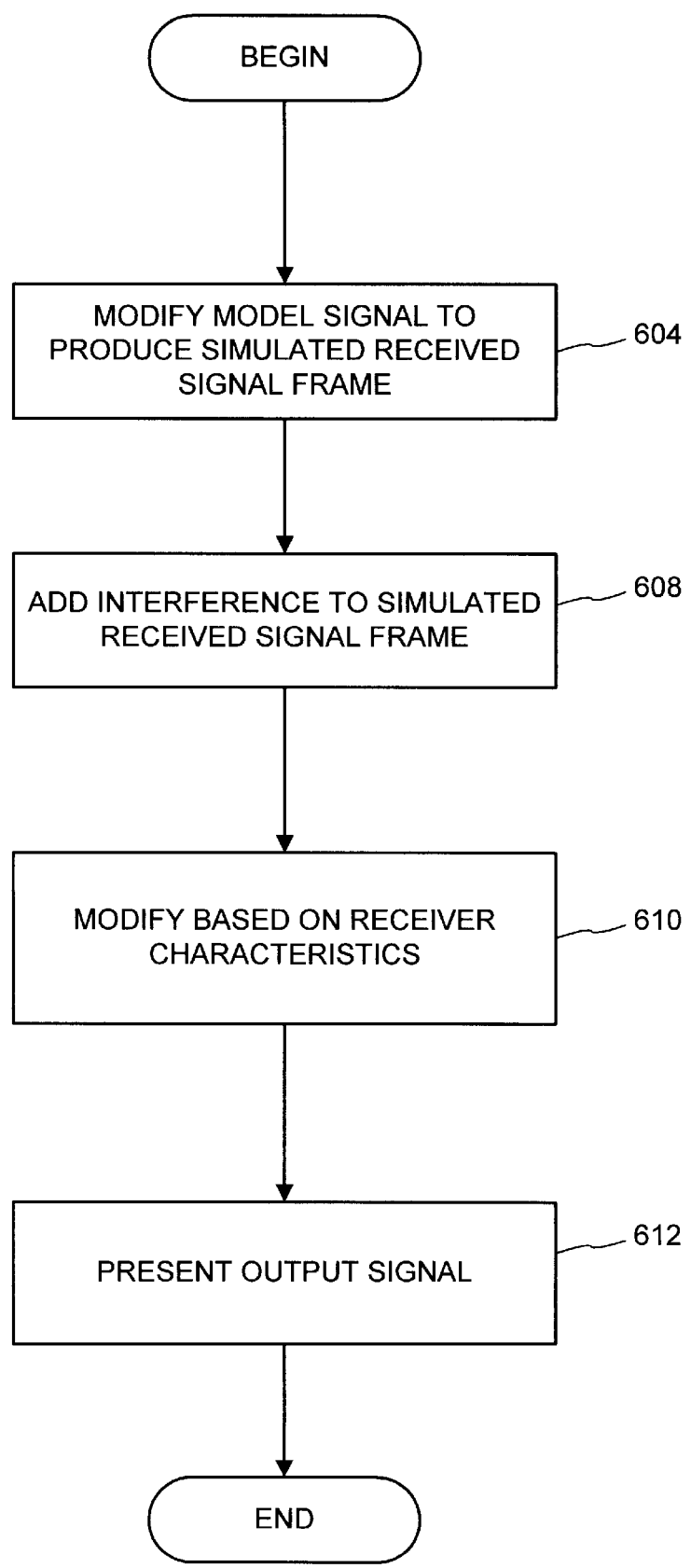
FIG. 6 is a more detailed flowchart of a method according to the invention for executing the steps of FIG. 4.

The details for presenting a simulated output signal are shown in FIG. 6. During the presentation of the simulated output signal, additional attributes of the signal such as interference may be calculated. The illustrated method includes modifying a model signal to simulate a received signal, adding interference, and modifying to simulate receiver characteristics.

At step 604, a model signal frame is modified to produce a simulated received signal frame. A model signal frame can be obtained in many different ways. For audio reception simulation, the program issues a function call which reads a frame of the digitized audio signal bits from a .WAV file and stores them in memory. For image reception simulation, the program retrieves a data file such as a GIF (Graphics Interchange Format), TIFF (Tagged Image File Format), or BMP (Microsoft Windows Bitmap file). For video reception simulation, the program issues a function call which retrieves a frame of video from a video AVI file or from a video capture card when using a video camera source. The video frame is placed in memory. This stored video frame is the video model signal M. For a microphone source, the signal from the microphone is digitized using an analog-to-digital converter (A/D) so that it is represented by a stream of bits. A frame of the stream of bits is read into memory. This stored frame is the audio model signal M.

Then, the model signal M is modified using channel response R. For the model signal M stored in memory, a convolution operation with the channel response R is performed. Convolution is a well known mathematical operation described in many textbooks. For detail concerning computer source code for implementing the convolution operation, see W. H. Press, B. P. Flannery, S. A. Teukolsky and W. T. Vetterling, *Numerical Recipes,* pp. 472–474, Cambridge University Press, Cambridge, United Kingdom 1989, which is hereby incorporated by reference. The result of the convolution operation is stored in memory is the desired signal at the input of the communication system receiver, V.

At step 608, interference I is calculated and added to the desired received signal V. The amplitude or power of signals from other transmitters specified in step 502, which represent interference to the desired received signal V is calculated using propagation models as described in step 506. The total power of the interference I is found by adding the powers for all interfering signals at the simulation location L. The interfering power can be represented in several ways. One way is to represent interference is as a gaussian noise source which is added to the desired signal. The interference noise I can be represented as a gaussian distributed noise source which is created using a random number generator. For detail concerning computer code for implementing a gaussian random number generator, see W. H. Press, B. P. Flannery, S. A. Teukolsky and W. T. Vetterling. *Numerical Recipes,* pp. 472–474, Cambridge University Press, Cambridge, United Kingdom 1989. Other, more complex, and detailed methods to represent the interference effect on the desired signal can also be used. A random interference noise voltage value as created by the gaussian random number generator is added to each storage location for V. The result is stored in memory as the simulated signal composite V+I.

At step 610, the simulated signal composite V+I is modified using receiver characteristics. A receiver noise signal N is added to the simulated signal composite V+I to produce a simulated noise-signal composite V+I+N. The receiver noise N can be represented as a gaussian distributed noise source which as be created using a random number generator. At each storage location for the simulated signal composite V+I, the random noise voltage value as created by the gaussian noise generator is added to it. The amplitude of the noise voltage is determined by user input in step 502 but may be determined according to some other method. The result is stored in memory as the simulated output signal S. Optionally, the simulated noise-signal composite V+I+N is modified with other receiver characteristics to generate the simulated output signal S.

At step 612, the output signal is presented. For simulated audio signal reception, an appropriate function call is used to send the simulated output signal S to amplifiers and speakers, or other audio output device. For simulated image reception, the simulated output signal S is an image stored in memory. For simulated video signal reception, the simulated output signal S is a video frame stored in memory. This video frame is output using an appropriate function call to display S on a computer monitor or other video display device. For simulated image reception, the simulated output signal is similarly displayed.

In some cases, it may be desirable to perform an abbreviated form of the process described above. For example, certain steps may be simplified or omitted to reduce the complexity of the calculations while still embodying the invention.

Example Illustrated Embodiment Using Video

Figure 7:
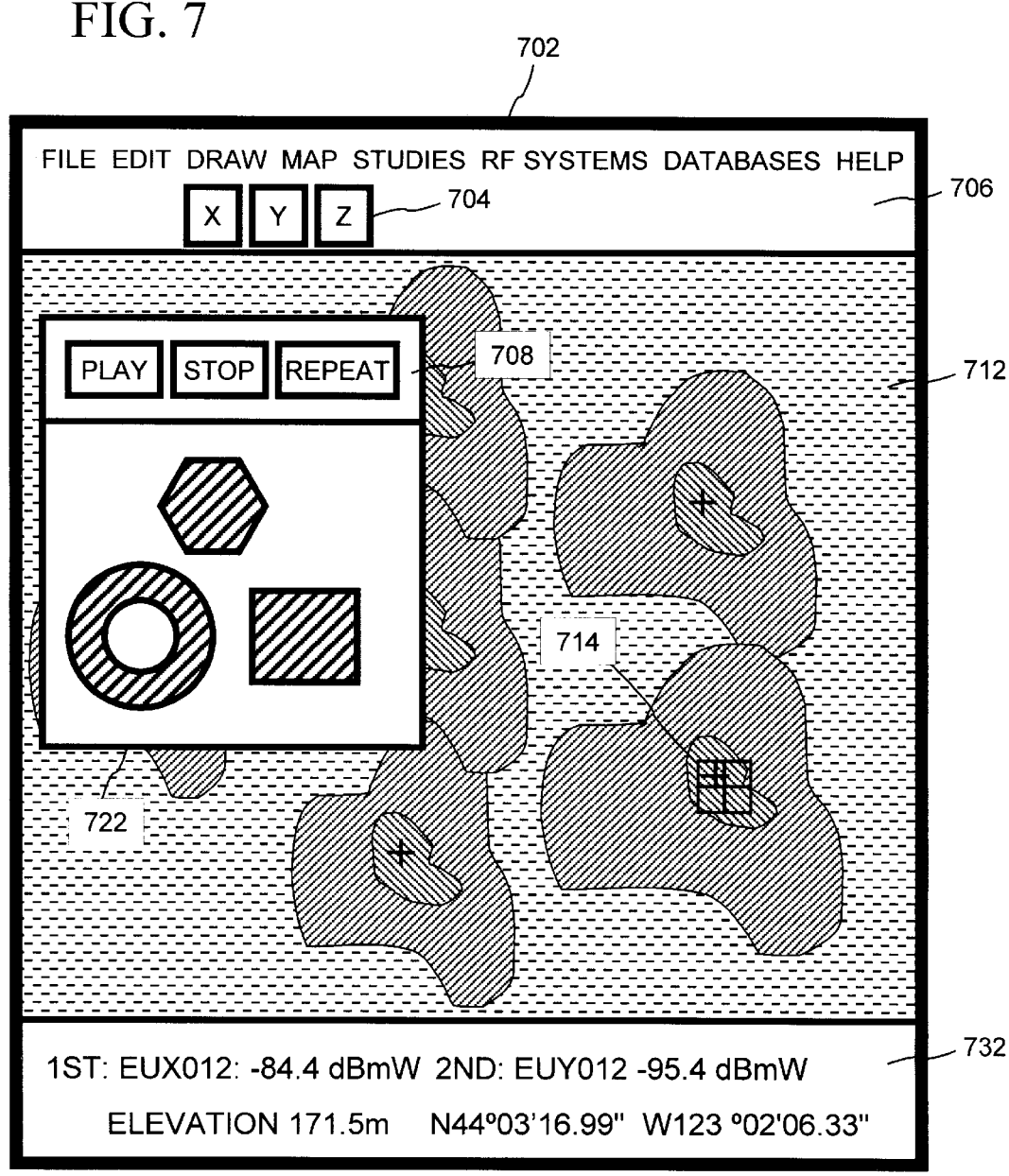
FIGS. 7–10 are screen displays presented by an embodiment of the invention showing simulated video output signals for consideration by a communication system designer.

FIGS. 7–10 show various display windows generated by an exemplary embodiment of the invention implemented by software in a graphical user interface environment. The exemplary embodiment uses a video template signal, which is modified to denote power level as calculated for a selected geographical location on a system map. With reference now to FIG. 7, a display window 702 is generated by a software program for embodying the invention. A command pane 706 includes menu items and icon buttons 704 for performing various actions (e.g., zooming or repositioning the display). The system map 712 is displayed in the window 702 and graphically depicts the attributes of a simulated communication network as represented by communication system parameters input by a user and stored in a file for later retrieval. In the illustrated embodiment, signal characteristics are denoted by presenting portions of the system map in various colors denoting a range of values. However, some other indicia (e.g., text indicating a value range) can be used instead of color. The illustrated embodiment depicts a geographical area (e.g., a metropolitan area) and shows transmit stations in the network using plus (i.e., "+") symbols. When the user employs a mouse or other pointing device to move the cursor 714 and select a particular geographical location on the system map 712, the status pane 732 displays the calculated power level (or other selected signal characteristic) from a best (or "first") and second best (or "second") transmit station (also called a "server"). The status pane 732 also indicates the name of the best and second best transmit station as assigned in the communication system parameters (e.g., transceiver "EUX 012"). Signal characteristics are calculated based on the communication system parameters and the selected geographical location. The status pane 732 also displays the elevation, latitude, and longitude of the selected geographical location.

Video pane 722 shows a video (e.g., as modified from an MPEG video file) and is controlled by control pane 708. The quality of the video picture in pane 722 reflects the calculated power level of the best (i.e, "first") signal. In the example shown in FIG. 7, the power level at the location selected at the cursor 714 is a strong −84.4 dBmW, and the quality of the video picture in pane 722 is virtually perfect.

Figure 8:
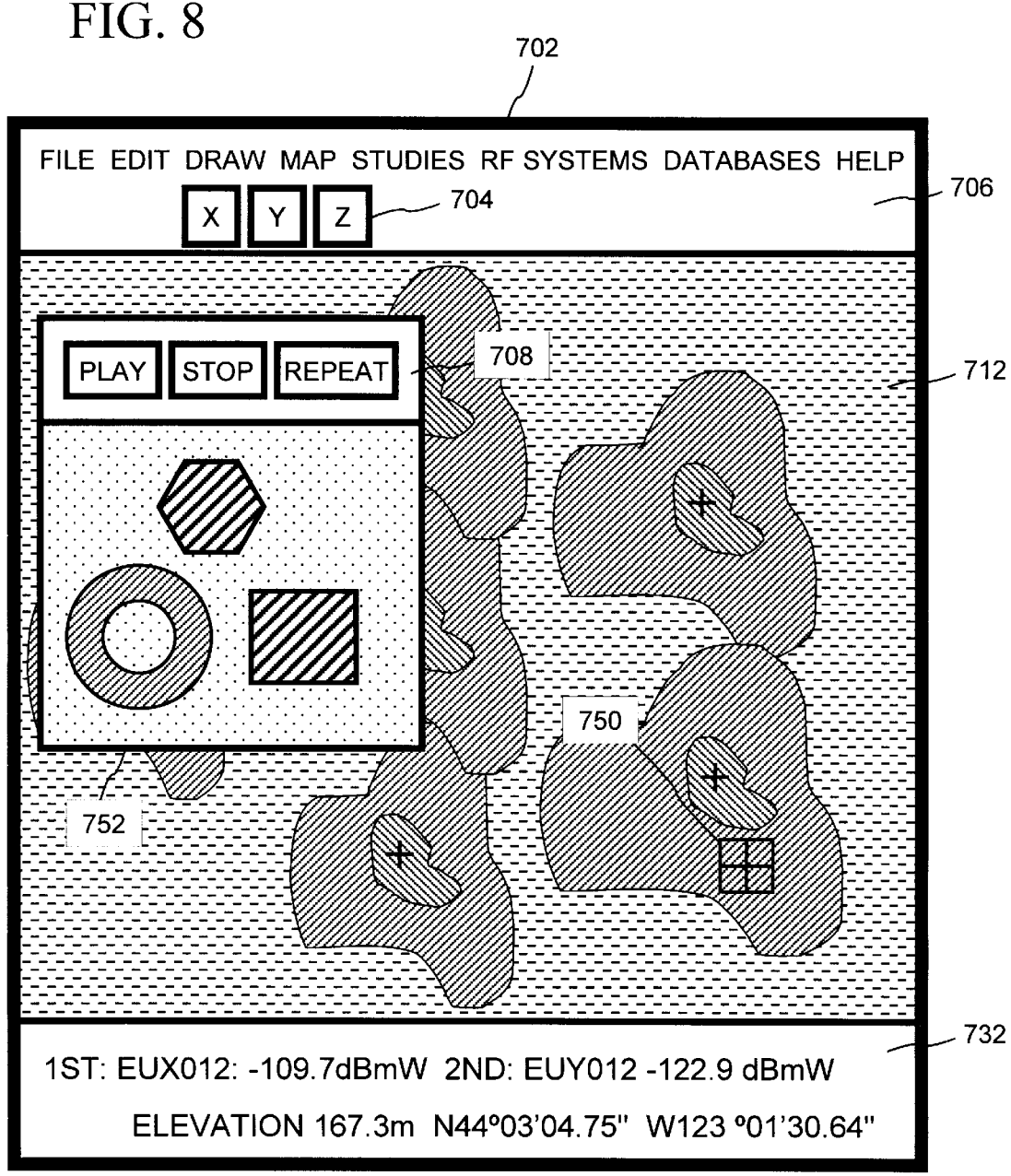
Figure 9:
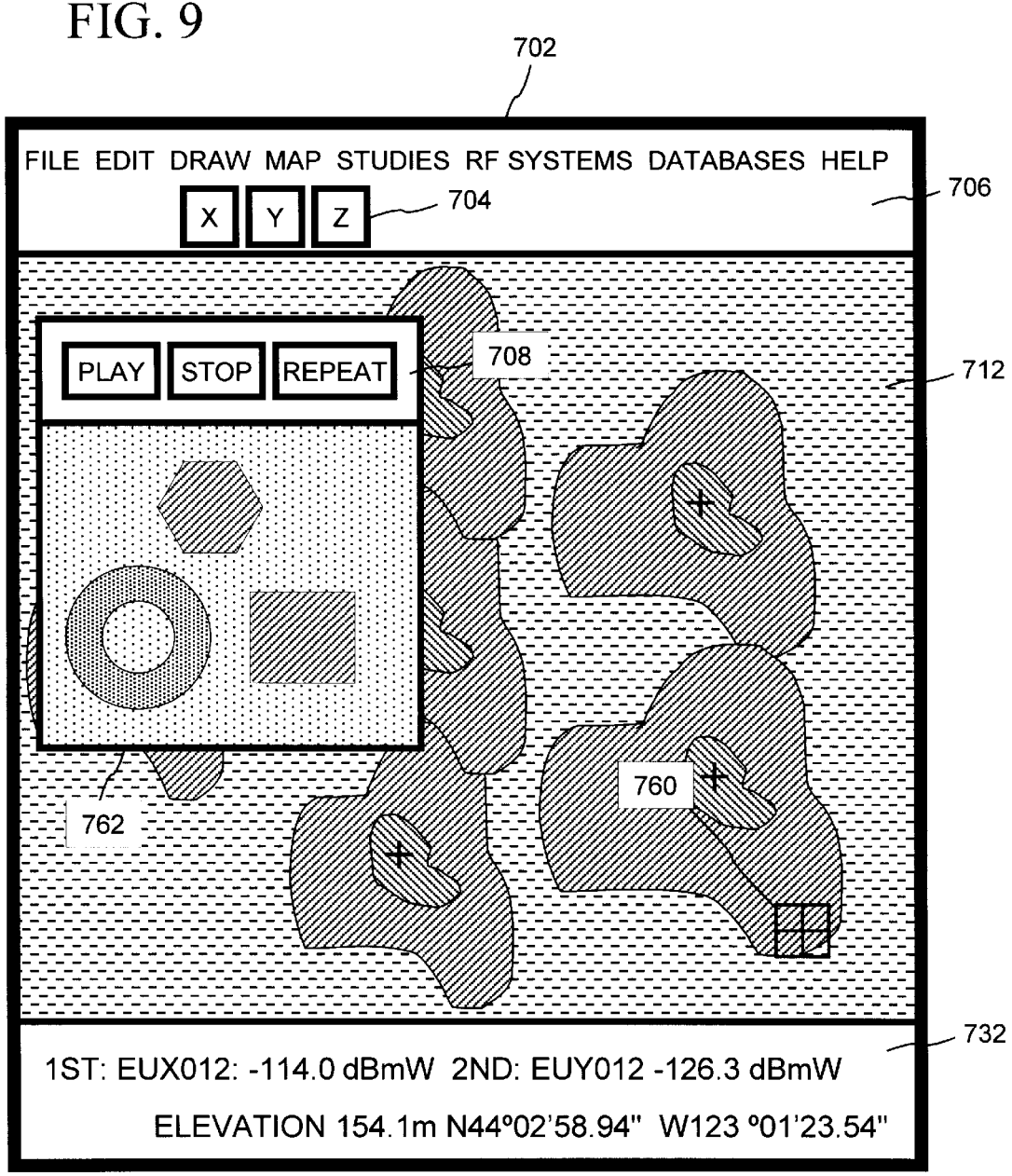
Figure 10:
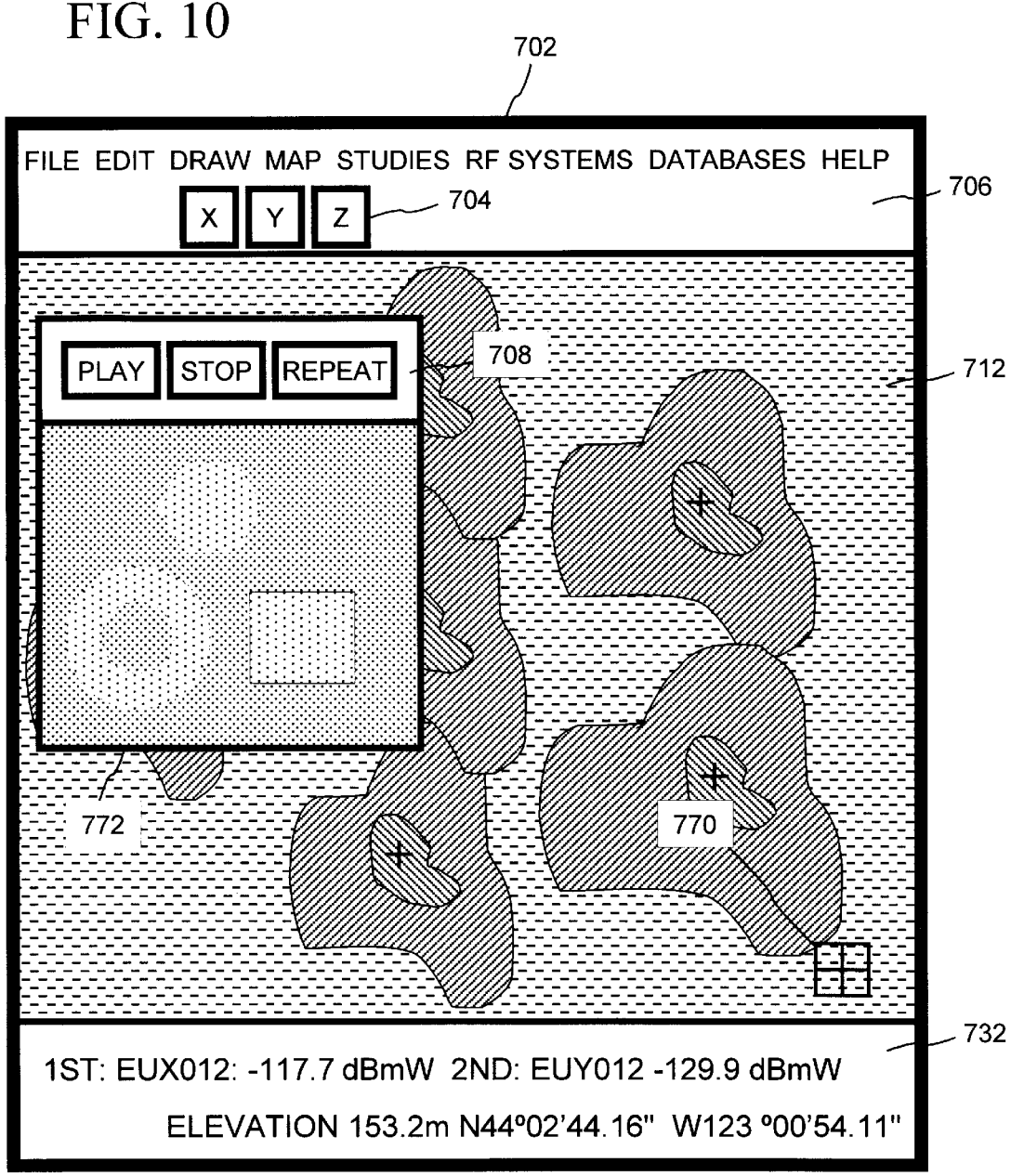

Turning now to FIG. 8, the user has selected a location indicated by the cursor 750. The power level of the signal has dropped to a weak −109.7 dBmW at the selected location, and the video picture in pane 752 is degraded. In FIG. 9, the user has selected a location indicated by the cursor 760. The power level of the signal at the selected location has dropped to −114.0 dBmW, an even weaker signal. Accordingly, the video picture in pane 762 is very degraded. Finally, at FIG. 10, the user has selected a location indicated by the cursor 770, where the calculated power level is a very weak −117.7 dBmW. Accordingly, the video picture in pane 772 is of unusable quality.

The software provides an option to incorporate a sound track to accompany the video pane to provide an aural indication of signal quality. In this way, the user is provided with both visual and audio feedback about signal characteristics at the selected location. In addition, the user can specify that channel characteristics other than power level (e.g., field strength) be calculated and displayed.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A computer-implemented method for predicting signal reception in a simulated communication system represented by communication system parameters stored in a computer system, the method comprising:

determining from an input device a simulation location value indicative of a selected location in the communication system;

calculating, from the simulation location value and the communication system parameters, a predicted signal attribute value of a signal received by a receiving device at the selected location; and generating a simulated output signal of a receiving device for presentation at an output device, the simulated output signal exhibiting the predicted signal attribute value.

2. The method of claim 1 wherein the simulated output signal is generated by modifying a model signal frame according to the predicted signal attribute value.

3. The method of claim 1 further comprising:

collecting the communication system parameters from a user, the communication system parameters defining elements of the communication system, the elements comprising representations of a plurality of radio transmit stations in a wireless communication system.

4. The method of claim 1 wherein the communication system comprises elements and the simulation location value indicates a logical location within elements of the communication system.

5. The method of claim 1 wherein plural predicted signal attribute values for plural locations are calculated seriatim from a stored data file of plural simulation location values comprising a geographical simulation route in the communication system.

6. The method of claim 1 wherein the simulation location value indicates a first geographical location;

calculating the predicted signal attribute value comprises calculating a power level of a signal simulated as received by a receiving device at the first geographical location from a transmitter at a second geographical location; and generating the simulated output signal comprises adding noise to a reference data frame to generate a simulated data frame for presentation at an output device, severity of the noise correlating to the power level.

7. The method of claim 6 wherein the simulated data frame is one of a plurality of simulated image frames, the method further comprising:

presenting the simulated image frames at a video output device to simulate reception of a video signal.

8. The method of claim 6 wherein the simulated data frame is one of a plurality of simulated sound frames, the method further comprising:

presenting the simulated sound frames at an audio output device to simulate reception of an audio signal.

9. A computer-readable medium having computer-executable instructions for performing the following actions to predict signal reception in a communication system represented by communication system parameters stored in a computer system:

determining from an input device a simulation location value indicative of a selected location in the communication system;

calculating, from the simulation location value and the communication system parameters, a predicted signal attribute value of a signal received by a receiving device at the selected location; and generating a simulated output signal of a receiving device for presentation at an output device, the simulated output signal exhibiting the predicted signal attribute value.

10. A computer-readable medium having computer-executable instructions for performing the following actions to predict signal reception in a communication system represented by communication system parameters stored in a computer system:

determining from an input device a simulation location value indicative of a selected location in the communication system;

calculating, from the simulation location value and the communication system parameters, a predicted signal attribute value of a signal received by a receiving device at the selected location; and generating a simulated output signal of a receiving device for presentation at an output device, the simulated output signal exhibiting the predicted signal attribute value;

wherein the simulation location value indicates a first geographical location;

calculating the predicted signal attribute value comprises calculating a power level of a signal simulated as received by a receiving device at the first geographical location from a transmitter at a second geographical location;

generating the simulated output signal comprises adding noise to a reference data frame to generate a simulated data frame for presentation at an output device, severity of the noise correlating to the power level; and wherein the simulated data frame is one of a plurality of simulated sound frames, the method further comprising:

presenting the simulated sound frames at an audio output device to simulate reception of an audio signal.

11. In a computer, a system for simulating signal reception at a selected location in a simulated communication system represented by communication system parameters stored on the computer, the system comprising:

a location selector operable for receiving a location in the communication system and generating a location value indicative of the location;

a received signal attribute calculator responsive to the location value and operable for calculating a predicted signal attribute value for a signal simulated as received by a receiving device in the communication system at the location; and an output signal generator responsive to the predicted signal attribute value and operable for generating an output signal simulated as output by a receiving device and manifesting the predicted signal attribute value.

12. The system of claim 11 further comprising:

a model data frame, wherein the output signal generator generates the output signal by performing a convolution operation on the model data frame.

13. The system of claim 11 further comprising:

a model data frame; and an interference calculator operable for determining an interference power at the location, wherein the output signal generator is operable for generating the output signal by performing a convolution operation on the model data frame to generate a simulated input signal frame and adding noise to the input signal frame according to the interference power to generate an output signal frame.

14. The system of claim 13 further comprising:

a receiver noise generator operable for simulating receiver noise from user-supplied parameters and adding the receiver noise to the output frame.

15. The system of claim 11 wherein the location selector is further operable for reading a stored set of geographical locations forming a route of a simulated radio frequency receiver and generating seriatim location values indicative of locations on the route.

16. The system of claim 11 further comprising:

a system map generator operable for presenting a pictorial representation of the simulated communication system, wherein the location selector is operable for receiving a user selection from the pictorial representation associated with a location in the communication system.

17. The system of claim 11 further comprising:

a set of ordered model data frames representing a transmitted signal, wherein the output signal generator selects, seriatim and in order, a data frame from the set to simulate reception of the transmitted signal.

18. The system of claim 17 wherein the location selector is further operable for reading a stored set of geographical locations forming a route of a simulated radio frequency receiver and generating seriatim location values indicative of locations on the route.

19. A computer implemented method for presenting to a computer user an output signal simulated as received by a receiving device in a simulated communication system having a plurality of simulated radio frequency transmitters, the method comprising:

presenting a system map for representing the simulated communication system;

determining from an input pointing device a simulation location value indicative of a position on the system map selected by the user and associated with a geographical location;

calculating from the simulation location value a predicted channel response value indicative of channel response of a signal simulated as received by a receiving device at the selected geographical location from one of the transmitters;

modifying a model signal frame with the channel response using a convolution function to generate a simulated input signal frame;

calculating from the simulation location value a predicted interference value indicative of interference to a signal simulated as received at the selected geographical location;

generating a simulated signal composite frame from the simulated input signal frame with the predicted interference value using a random number generator to simulate interference;

adding simulated receiver noise to the signal composite frame according to receiver noise characteristics to generate a simulated output signal frame; and presenting the simulated output signal frame to the user as part of an audio video presentation.

20. A computer-readable medium having computer-executable instructions for performing the following actions to present to a computer user an output signal simulated as received by a receiving device in a simulated communication system having a plurality of simulated radio frequency transmitters:

presenting a system map for representing the simulated communication system;

determining from an input pointing device a simulation location value indicative of a position on the system map selected by the user and associated with a geographical location;

calculating from the simulation location value a predicted channel response value indicative of channel response of a signal simulated as received by a receiving device at the selected geographical location from one of the transmitters;

modifying a model signal frame with the channel response using a convolution function to generate a simulated input signal frame;

calculating from the simulation location value a predicted interference value indicative of interference to a signal simulated as received at the selected geographical location;

generating a simulated signal composite frame from the simulated input signal frame with the predicted interference value using a random number generator to simulate interference;

adding simulated receiver noise to the signal composite frame according to receiver noise characteristics to generate a simulated output signal frame; and presenting the simulated output signal frame to the user as part of an audio video presentation.

* * * * *